（12） United States Patent
Webster et al.

(10) Patent No.: US 10,603,645 B2
(45) Date of Patent: Mar. 31, 2020

(54) DIFFUSER ASSEMBLY AND ASSOCIATED METHODS

(71) Applicant: Waters Technologies Corporation, Milford, MA (US)

(72) Inventors: Michael Webster, Gibsonia, PA (US); David Sauers, Rural Ridge, PA (US); Curt White, Pittsburgh, PA (US); Steven Stricko, Trafford, PA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 15/915,602

(22) Filed: Mar. 8, 2018

(65) Prior Publication Data
US 2018/0257048 A1 Sep. 13, 2018

Related U.S. Application Data

(60) Provisional application No. 62/469,356, filed on Mar. 9, 2017.

(51) Int. Cl.
*B01F 5/06* (2006.01)
*B01D 11/02* (2006.01)
*C11B 1/10* (2006.01)

(52) U.S. Cl.
CPC ........ *B01F 5/0691* (2013.01); *B01D 11/0203* (2013.01); *B01D 11/0219* (2013.01);
(Continued)

(58) Field of Classification Search
CPC ............... B01F 5/0691; B01D 11/0203; B01D 11/0219; C11B 1/104
See application file for complete search history.

(56) References Cited

U.S. PATENT DOCUMENTS

| 4,719,011 A | * | 1/1988 | Shalon | B01D 15/14 210/198.2 |
| 5,193,703 A | | 3/1993 | Staats, III et al. | |
| 2005/0211617 A1 | * | 9/2005 | Held | B01D 15/22 210/198.2 |

FOREIGN PATENT DOCUMENTS

CN 104548655 A 4/2015
EP 0793986 A1 9/1997
(Continued)

OTHER PUBLICATIONS

Internation Search Report and the Written Opinion of the International Searching Authority relating to counter-part International Application No. PCT/IB2018/051526, completed on Jun. 13, 2018 and dated Jun. 26, 2018.

*Primary Examiner* — Sean E Conley
(74) *Attorney, Agent, or Firm* — Womble Bond Dickinson (US) LLP; Deborah M. Vernon; Heath T. Misley

(57) ABSTRACT

Exemplary embodiments are directed to a diffuser assembly configured to be disposed in an extraction path of an extracting solvent in an extraction vessel. The diffuser assembly includes a housing configured to be disposed within the extraction vessel, the housing including an inner surface and an outer surface. The diffuser assembly includes an inlet structure disposed within the housing. The diffuser assembly includes an outlet structure disposed within the housing and spaced from the inlet structure to form a mixing chamber between the inlet structure and the outlet structure. The inlet structure and the outlet structure each have a porosity configured for passage of the extracting solvent therethrough. Passage of the extracting solvent through the inlet structure, the mixing chamber, and the outlet structure redistributes flow of the extracting solvent along the extraction path.

13 Claims, 11 Drawing Sheets

(52) U.S. Cl.
CPC .......... *B01D 11/0284* (2013.01); *C11B 1/104* (2013.01); *B01F 2215/0036* (2013.01)

(56) References Cited

FOREIGN PATENT DOCUMENTS

| | | |
|---|---|---|
| EP | 0466291 A2 | 6/2018 |
| WO | 2005087339 A1 | 9/2005 |

* cited by examiner

DIFFUSER ASSEMBLY AND ASSOCIATED METHODS

RELATED APPLICATIONS

This application claims benefit of and priority to U.S. Provisional Application No. 62/469,356 titled DIFFUSER ASSEMBLY AND ASSOCIATED METHODS filed on Mar. 9, 2017, the contents of which are incorporated herein by reference in their entirety.

TECHNICAL FIELD

The present disclosure relates to a diffuser assembly and, in particular, to a diffuser assembly for an extraction vessel that redistributes flow of an extracting solvent passing through the extraction vessel.

BACKGROUND

Supercritical fluid extraction (SFE) is a process of separating one component in a solid or semisolid matrix from other components in the matrix using supercritical fluids as the extracting solvent. SFE extraction can be performed by passing an extracting solvent, such as compressed $CO_2$, through an extraction vessel filled with a packed matrix. However, channeling of the extracting solvent can occur as it passes through the packed matrix. In particular, the extracting solvent can choose the path of least resistance through the packed matrix, thereby channeling into particular regions of the packed matrix. Channeling of the extracting solvent prevents substantially even flow distribution of the extracting solvent through the packed matrix, which reduces yield of the extract.

SUMMARY

In general, embodiments of the present technology are directed to a diffuser assembly that redistributes flow of an extracting solvent in an extraction vessel. In embodiments, the diffuser of the present technology reduces and/or prevents channeling of the extracting solvent. As a result, extraction yield from the matrix is increased.

In some embodiments, the diffuser assembly of the present technology can provide a redistribution of flow due to its configuration, design, and/or placement within the extraction vessel. For example, in some embodiments, the diffuser assembly prevents or minimizes the amount of the extracting solvent that can bypass or pass around a side or connection edge portion of the diffuser assembly. That is, in some embodiments, the diffuser assembly incorporates one or more seals on a connection edge to prevent the extracting solvent from bypassing the diffuser. In some embodiments, the one or more seals are fixed seals (meaning the seal securely connects the diffuser to a body of the extraction vessel in a fixed position).

In certain embodiments, the one or more seals are moveable or dynamic (meaning the seals allow the diffuser assembly to securely contact the body of the extraction vessel and block a passage way of the extracting solvent, but do not fix the diffuser assembly to a singular position). Dynamic seals allow for the diffuser assembly to slide or reposition itself along a single axis of the extraction vessel. A particular advantage to moveable seals is the allowance of the diffuser assembly to compact the packed matrix during extraction.

In accordance with embodiments of the present disclosure, an exemplary diffuser assembly configured to be disposed in an extraction path of an extracting solvent in an extraction vessel is provided. The diffuser assembly includes a housing configured to be disposed within the extraction vessel. The housing includes an inner surface and an outer surface. An inlet structure can be disposed within the housing. An outlet structure can be disposed within the housing and spaced from the inlet structure to form a mixing chamber between the inlet structure and the outlet structure. The inlet structure and the outlet structure each have a porosity configured for passage of the extracting solvent therethrough. Passage of the extracting solvent through the inlet structure, the mixing chamber, and the outlet structure substantially redistributes flow of the extracting solvent along the extraction path. That is, passage of the extracting solvent is redistributed along the extraction path more equally than in the prior art, which lacked the diffuser assembly of the present technology having the mixing chamber.

The diffuser assembly can include a first static seal disposed between the inner surface of the housing and the inlet structure, and a second static seal disposed between the inner surface of the housing and the outlet structure. In an embodiment, the first and second static seals can be O-rings. The diffuser assembly can also include one or more seals on the outer surface of the housing. For example, in one embodiment, the diffuser assembly includes one or more dynamic seals disposed on the outer surface of the housing. The one or more dynamic seals prevent the extracting solvent from flowing around the diffuser assembly within the extraction vessel while allowing the diffuser assembly to slide along the extraction path within the extraction vessel under pressure of the extracting solvent. In another embodiment, the diffuser assembly can include one or more static seals disposed on the outer surface of the housing. The one or more static seals prevent the extracting solvent from flowing around the diffuser assembly within the extraction vessel and maintain a static position of the diffuser assembly along the extraction path within the extraction vessel.

In an embodiment, the extracting solvent can be a solvent gas or liquid (e.g., compressed $CO_2$). Redistribution of flow of the extracting solvent along the extraction path can result in a substantially more even flow distribution of the extracting solvent through the extraction vessel. Each of the inlet structure and the outlet structure can be a frit including a plurality of openings. In an embodiment, each of the plurality of openings can be dimensioned between approximately 0.5 µm and approximately 25 µm. In an embodiment, each of the plurality of openings can be dimensioned between approximately 1 µm and approximately 20 µm. In an embodiment, each of the plurality of openings can be dimensioned between approximately 1 µm and approximately 15 µm. In an embodiment, each of the plurality of openings can be dimensioned between approximately 1 µm and approximately 10 µm. In an embodiment, each of the plurality of openings can be dimensioned as approximately 5 µm (e.g., nominally).

In an embodiment, the frit can include porous sintered metal. In an embodiment, each frit can define a substantially disk-like configuration. In an embodiment, the size of the plurality of openings of the inlet structure can be dimensioned equal to a size of the plurality of openings of the outlet structure. In an embodiment, the size of the plurality of openings of the inlet structure can be dimensioned different from a size of the plurality of openings of the outlet structure. Redistribution of flow of the extracting solvent substantially reduces or prevents channeling of the extracting solvent through a matrix packing within the extraction path of the extraction vessel. In an embodiment, one or more handles can be rotatably secured to the housing and configured to be positioned in an extended position or a stored position.

In accordance with embodiments of the present disclosure, an exemplary method of fluid extraction is provided. The method includes introducing an extracting solvent into an extraction vessel along an extraction path. The extraction vessel can include an inlet for introduction of the extracting solvent into the extraction vessel and an outlet for exit of the extracting solvent from the extraction vessel. The extraction vessel can include one or more diffuser assemblies disposed within the extraction vessel. Each of the one or more diffuser assemblies can include a housing configured to be disposed within the extraction vessel, the housing including an inner surface and an outer surface. Each of the one or more diffuser assemblies can include an inlet structure disposed within the housing, and an outlet structure disposed within the housing and spaced from the inlet structure to form a mixing chamber between the inlet structure and the outlet structure. The inlet structure and the outlet structure each have a porosity configured for passage of the extracting solvent therethrough. The extraction vessel includes a matrix packed within the extraction vessel on both sides of each of the one or more diffuser assemblies. The method includes redistributing flow of the extracting solvent along the extraction path with the one or more diffuser assemblies as the extracting solvent passes through the one or more diffuser assemblies.

Redistribution of flow of the extracting solvent with the one or more diffuser assemblies results in a substantially more even flow distribution of the extracting solvent through the extraction vessel. The one or more diffuser assemblies each include one or more seals configured to prevent the extracting solvent from bypassing the diffuser assembly along the extraction path. In an embodiment, the one or more diffuser assemblies each include one or more dynamic seals disposed on the outer surface of the housing, and the method includes sliding the one or more diffuser assemblies along the extraction path within the extraction vessel under pressure of the extracting solvent. In an embodiment, the matrix can be a plant matrix.

In accordance with embodiments of the present disclosure, an exemplary method of fluid extraction is provided. The method includes introducing an extracting solvent into an extraction vessel along an extraction path. The extraction vessel includes an inlet for introduction of the extracting solvent into the extraction vessel and an outlet for exit of the extracting solvent from the extraction vessel. The extraction vessel includes one or more diffuser assemblies disposed within the extraction vessel. The extraction vessel includes a matrix packed within the extraction vessel on both sides of each of the one or more diffuser assemblies. The method includes redistributing flow of the extracting solvent along the extraction path with the one or more diffuser assemblies as the extracting solvent passes through the one or more diffuser assemblies. Redistribution of flow of the extracting solvent with the one or more diffuser assemblies results in a substantially more even flow distribution of the extracting solvent through the extraction vessel.

Other embodiments will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed exemplary embodiments of a diffuser assembly, reference is made to the accompanying figures, wherein.

DESCRIPTION OF EXEMPLARY EMBODIMENTS

It should be understood that the relative terminology used herein, such as "front", "rear", "left", "top", "bottom", "vertical", and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

In general, the present technology is related to a diffuser assembly for use with an extraction vessel. Extraction vessels are generally packed with a matrix and an extracting solvent is passed through the extraction vessel to extract substances from the packed matrix. Channeling of the extracting solvent can occur in conventional extraction vessels, resulting in a reduction in yield of the extract. In some embodiments, the diffuser assemblies of the present technology are designed, configured, and/or adapted to work with the body of an extraction vessel to prevent or minimize channeling of the extracting solvent through the packed matrix. That is, the diffuser assemblies when positioned within an extraction vessel help to redistribute flow, such that (1) the extracting solvent cannot substantially bypass the diffuser assembly by flowing around it (i.e., passing around an edge portion of the diffuser) and (2) the extractant does not channel through singularly defined paths.

Due to the redistributed flow through the packed matrix, the extraction yield from the matrix is increased by the exemplary diffuser assemblies. One or more diffuser assemblies can be incorporated into a single extraction vessel. For example, multiple diffuser assemblies can be incorporated into an extraction vessel in a spaced manner to redistribute flow of the extracting solvent at multiple sections of the extraction vessel. In some embodiments, one or more fixed seals can fixedly secure the position of the diffuser assembly to the body of the extraction vessel such that the diffuser assembly remains in the same position during implementation. In some embodiments, one or more dynamic seals can be used to secure the diffuser assembly to the body of the extraction vessel. In such embodiments, the dynamic seals prevent the extracting solvent from flowing around the diffuser assembly, while allowing the diffuser assembly to slide or reposition itself along the length of the extraction vessel due to upstream pressure within the extraction vessel. In certain embodiments, such sliding or repositioning compacts the packed matrix with the diffuser assembly during extraction.

Figure 1:
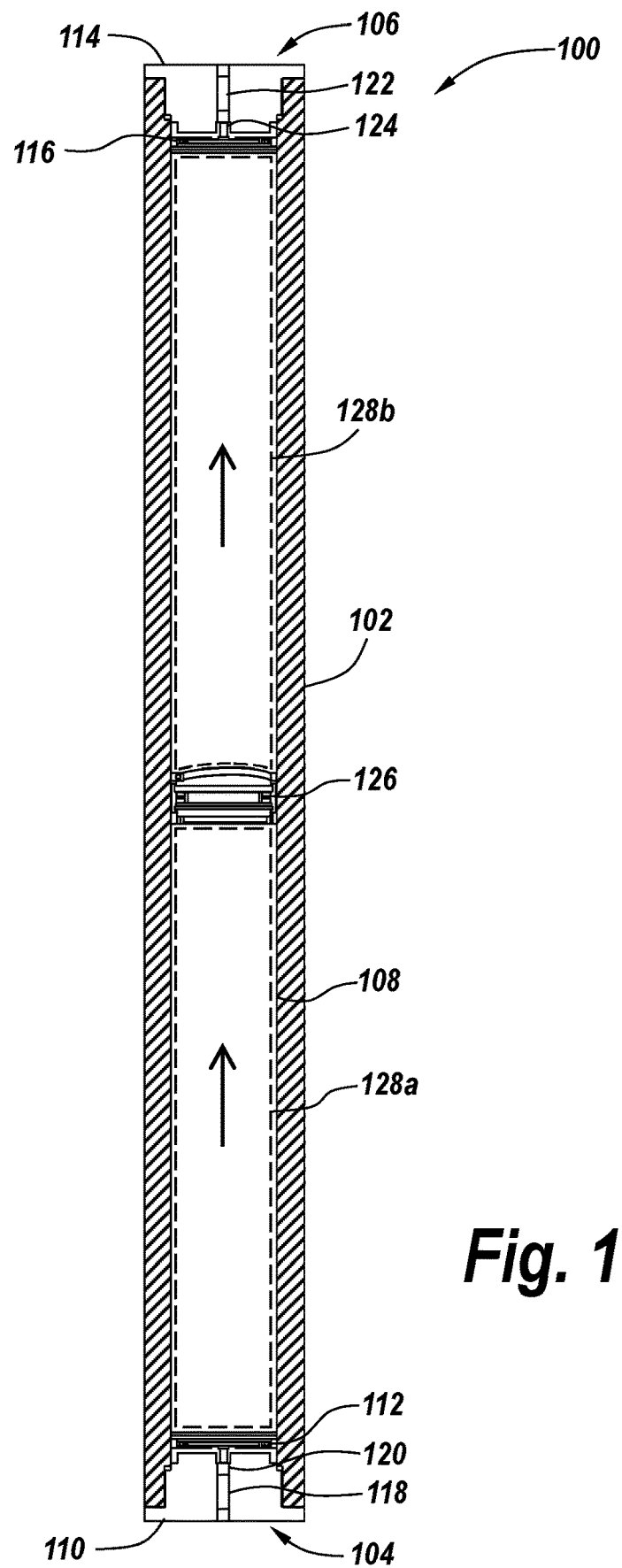
FIG. 1 is a diagrammatic, cross-sectional side view of an exemplary extraction vessel in accordance with embodiments of the present disclosure.

With reference to FIG. 1, a diagrammatic, cross-sectional side view of an exemplary extraction vessel 100 is provided. The extraction vessel 100 includes an elongated body 102 (e.g., a housing) with an inlet end 104 and an outlet end 106. The body 102 includes a passage 108 extending between the inlet end 104 and the outlet end 106. In some embodiments, the body 102 and the passage 108 define substantially cylindrical configurations.

The extraction vessel 100 includes an inlet cap 110 and an inlet frit holder assembly 112 secured to the inlet cap 110. The extraction vessel 100 includes an outlet cap 114 and an outlet frit holder assembly 116 secured to the outlet cap 114. In some embodiments, the inlet cap 110 and inlet frit holder assembly 112 include complementary threads such that the inlet frit holder assembly 112 can be threaded into the inlet cap 110. In some embodiments, the outlet cap 114 and outlet frit holder assembly 116 include complementary threads such that the outlet frit holder assembly 116 can be threaded into the outlet cap 114.

The inlet cap 110 includes an inlet passage 118 for introduction of an extracting solvent (e.g., a solvent gas or liquid, such as compressed $CO_2$) into the extraction vessel 100. The inlet frit holder assembly 112 includes an inner passage 120 fluidically connecting the inlet passage 118 with the passage 108 of the body 102. The outlet cap 114 includes an outlet passage 122 for exit of the extracting solvent from the extraction vessel 100. The outlet frit holder assembly 116 includes an inner passage 124 fluidically connecting the passage 108 of the body 102 with the outlet passage 122. Thus, the extracting solvent can travel along an extraction path extending between the inlet passage 118 and the outlet passage 122.

The extraction vessel 100 includes one or more diffuser assemblies 126 disposed within the passage 108 and between the inlet and outlet caps 110, 114. Thus, although illustrated as including a single diffuser assembly 126, it should be understood that the extraction vessel 100 can include multiple diffuser assemblies 126 disposed within the passage 108 and spaced from each other. Matrix 128a, 128b (e.g., an organic material (such as a plant matrix), an inorganic material, or the like) is packed into the passage 108, against the diffuser assembly 126, and against the inlet and outlet caps 110, 114 for extraction of a substance. The matrix 128a represents the "upstream matrix", i.e., upstream of the diffuser assembly 126, and the matrix 128b represents the "downstream matrix", i.e., downstream of the diffuser assembly 126. As will be discussed in greater detail below, as the extracting solvent is passed along the extraction path of the extraction vessel 100 through the packed matrix 128a, 128b, the diffuser assembly 126 redistributes flow of the extracting solvent along the extraction path, resulting in a substantially more even flow distribution of the extracting solvent through the extraction vessel 100. In particular, rather than passing through the path of least resistance in the packed matrix 128a, 128b and creating channels of extracting solvent flow with less exposure to the extractant, the diffuser assembly 126 terminates flow channels upstream of the diffuser assembly 126 and redistributes the extracting solvent flow across the entire cross-section of the packed matrix 128a, 128b to minimize formation of channels downstream of the matrix 128a, 128b, thereby increasing the amount of plant material contacted by the extracting solvent and the overall amount of material extracted per unit time.

Figure 2:
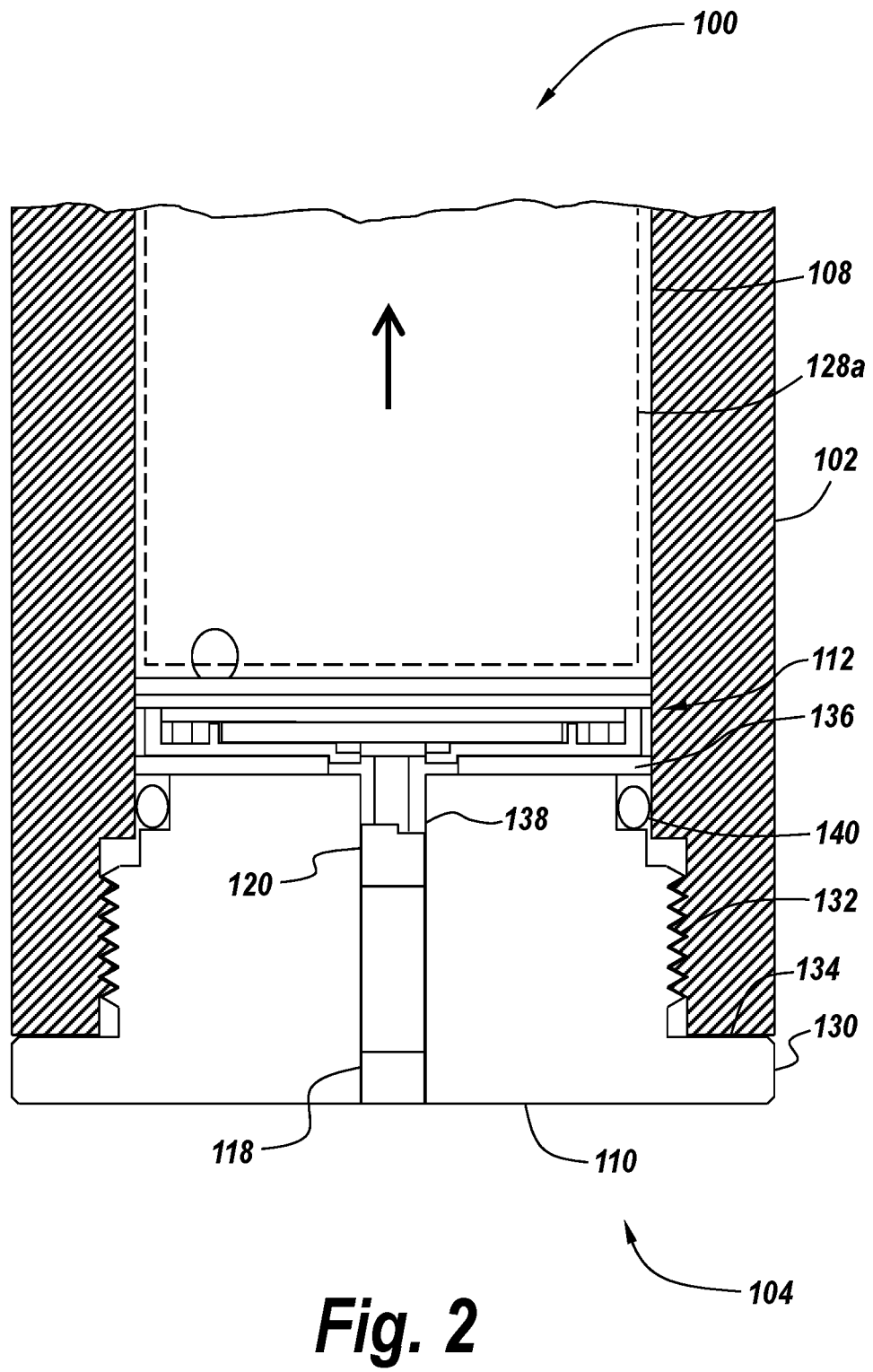
FIG. 2 is a diagrammatic, cross-sectional side view of an inlet end of an exemplary extraction vessel in accordance with embodiments of the present disclosure.

FIG. 2 is a diagrammatic, cross-sectional side view of the inlet end 104 of the extraction vessel 100. The inlet cap 110 generally defines a T-shaped cross-section and includes an outer section 130 and a cylindrical inner section 132. The inner section 132 includes threads complementary to threads formed on an inner surface of the passage adjacent to the inlet end 104 such that the inner section 132 can be threaded into the inlet end 104 of the body 102. With the inner section 132 threaded into the passage 108, the outer section 130 of the inlet cap 110 can be positioned against the end surface 134 of the body 102.

The inlet frit holder assembly 112 includes a body 136 defining a substantially disk-like configuration with a central protrusion 138 extending therefrom. The protrusion 138 includes outer threads complementary to inner threads formed in the inlet passage 118 such that the inlet frit holder assembly 112 can be threaded into the inlet cap 110. The inlet frit holder assembly 112 and/or the inlet cap 110 includes one or more seals 140 (e.g., static O-rings) disposed on an outer surface of the body 136 to prevent the extracting solvent from bypassing the inlet frit holder assembly 112. Thus, after the diffuser assembly 126 has been disposed in the passage 108 and the matrix 128 has been packed into the passage 108 between the diffuser assembly 126 and the inlet end 104, the assembled inlet cap 110 and inlet frit holder assembly 112 can be used to seal the inlet end 104 of the extraction vessel 100. In some embodiments and as discussed below with respect to FIGS. 8 and 9, the inlet frit holder assembly 112 can be configured to retain a porous inlet structure for evenly distributing flow of the extracting solvent into the passage 108. The inlet passage 118 can be fluidically connected to an extracting solvent source and pump such that the extracting solvent can be introduced into the extraction vessel 100.

Figure 3:
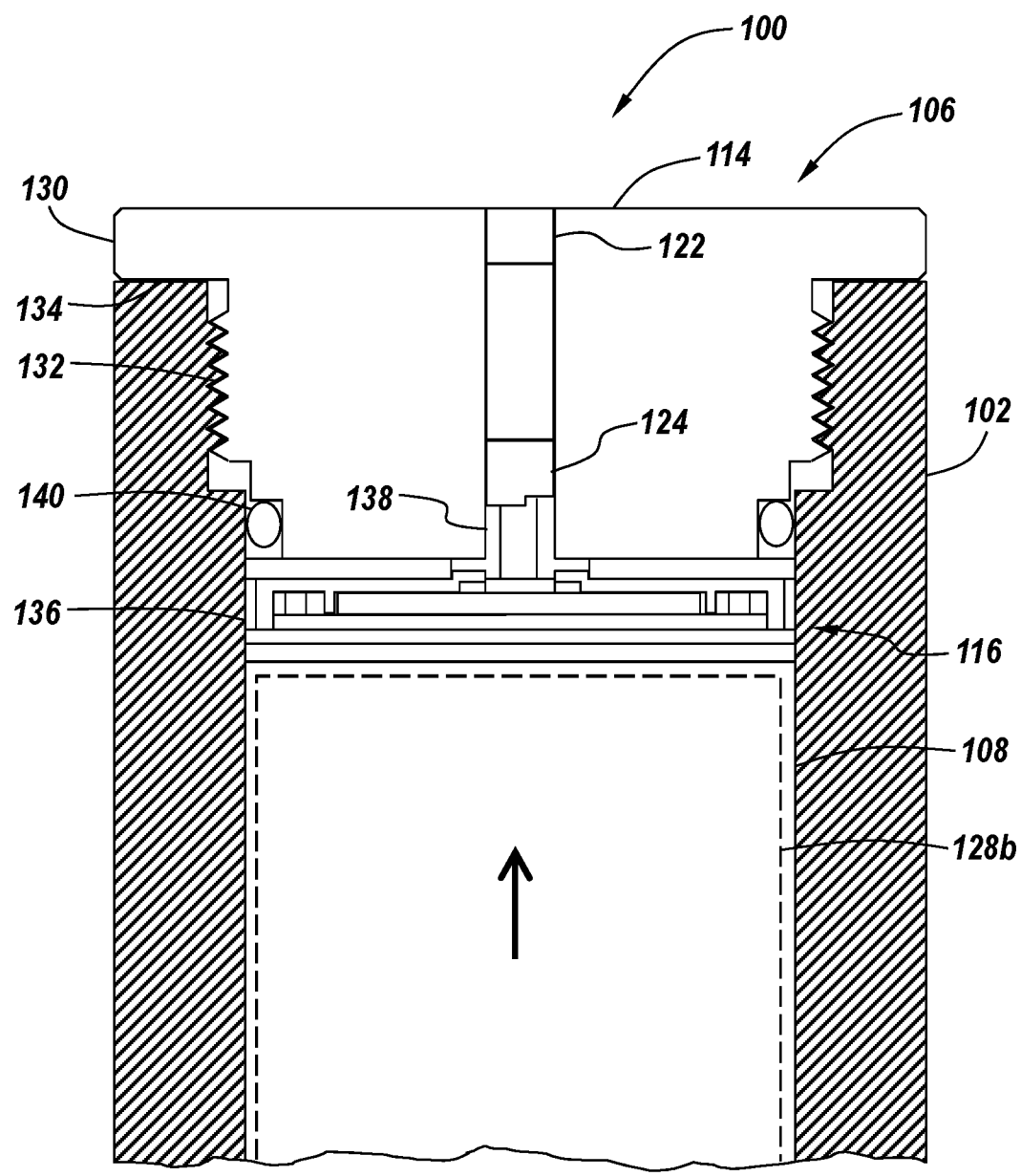
FIG. 3 is a diagrammatic, cross-sectional side view of an outlet end of an exemplary extraction vessel in accordance with embodiments of the present disclosure.

FIG. 3 is a diagrammatic, cross-sectional side view of the outlet end 106 of the extraction vessel 100. The outlet end 106 can be substantially similar in structure and function to the inlet end 104. Therefore, like reference numbers are used to represent like structures. In particular, the outlet cap 114 generally defines a T-shaped cross-section and also includes an outer section 130 and a cylindrical inner section 132. The inner section 132 can be threaded into the outlet end 106 of the body 102 to engage the outlet cap 114 with the body 102. With the inner section 132 threaded into the passage 108, the outer section 130 of the outlet cap 114 can be positioned against the end surface 134 of the body 102.

The outlet frit holder assembly 116 includes a body 136 defining a substantially disk-like configuration with a central protrusion 138 extending therefrom. The protrusion 138 can be threaded into the outlet cap 114 to engage the outlet frit holder assembly 116 with the outlet cap 114. The outlet frit holder assembly 116 and/or the outlet cap 114 includes one or more seals 140 (e.g., static O-rings) disposed on an outer surface of the body 136 to prevent the extracting solvent from bypassing the outlet frit holder assembly 116. Thus, after the diffuser assembly 126 has been disposed in the passage 108 and the matrix 128 has been packed into the passage 108 between the diffuser assembly 126 and the outlet end 106, the assembled outlet cap 114 and outlet frit holder assembly 116 can be used to seal the outlet end 106 of the extraction vessel 100. In some embodiments and as discussed below with respect to FIGS. 8 and 9, the outlet frit holder assembly 116 can be configured to retain a porous outlet structure for evenly distributing flow of the extracting solvent out of the passage 108. The outlet passage 122 can be fluidically connected to an extraction line such that extractant and substances dissolved in it can be collected outside of the extraction vessel 100.

Figure 4:
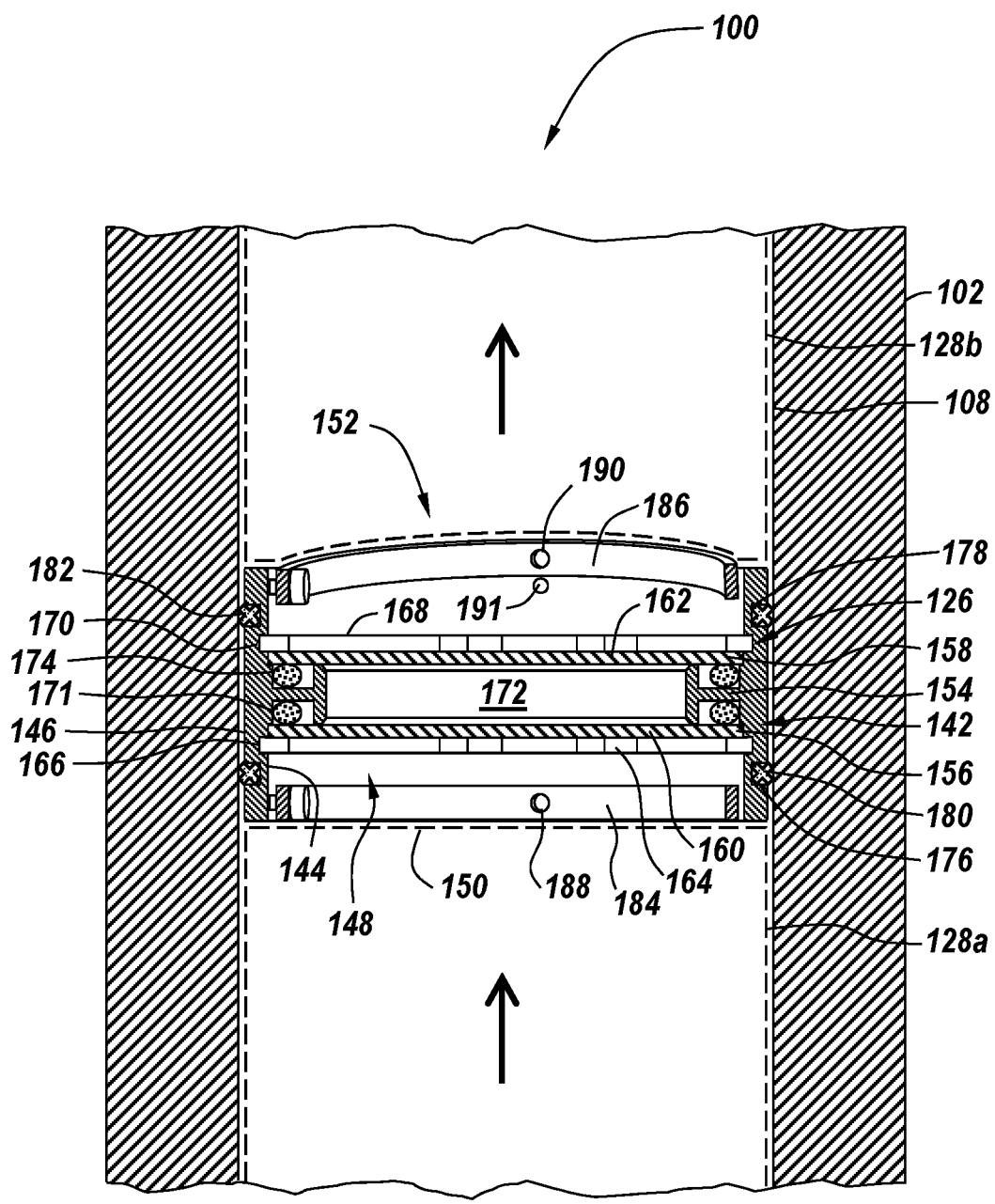
FIG. 4 is a diagrammatic, cross-sectional side view of an exemplary diffuser assembly in accordance with embodiments of the present disclosure.

FIG. 4 is a diagrammatic, cross-sectional side view of the diffuser assembly 126. Although illustrated within the extraction vessel 100, it should be understood that the diffuser assembly 126 can be incorporated into a variety of extraction vessels having different configurations. The diffuser assembly 126 includes a housing 142 configured and dimensioned to be disposed within the passage 108 of the extraction vessel 100 (e.g., a substantially cylindrical housing). The housing 142 includes an inner surface 144 and an outer surface 146, with the outer surface 146 configured to be disposed adjacent to the inner surface of the passage 108. The inner surface 144 forms a passage 148 extending through the diffuser assembly 126 between an upstream end 150 and a downstream end 152, the extracting solvent passing through the passage 148 during implementation of the diffuser assembly 126 in the extraction vessel 100.

The housing 142 includes a circumferential protrusion 154 extending from the inner surface 144. The protrusion 154 defines a substantially T-shaped cross-section. The diffuser assembly 126 includes inlet and outlet structures 156, 158 disposed within the housing 142. The inlet and outlet structures 156, 158 can each be a substantially disk-shaped frit including a plurality of openings 160, 162 extending through the thickness of the frit. In particular, the porosity of the inlet and outlet structures 156, 158 is configured for passage of the extracting solvent therethrough.

In an embodiment, each of the plurality of openings 160, 162 can be dimensioned between approximately 0.5 μm and approximately 25 μm. In an embodiment, each of the plurality of openings 160, 162 can be dimensioned between approximately 1 μm and approximately 20 μm. In an embodiment, each of the plurality of openings 160, 162 can be dimensioned between approximately 1 μm and approximately 15 μm. In an embodiment, each of the plurality of openings 160, 162 can be dimensioned between approximately 1 μm and approximately 10 μm. In an embodiment, each of the plurality of openings 160, 162 can be dimensioned as approximately 5 μm (e.g., nominally). In an embodiment, the size of the openings 160 of the inlet structure 156 can be dimensioned substantially equal to the size of the openings 162 of the outlet structure 158. In an embodiment, the size of the openings 160 of the inlet structure 156 can be dimensioned different from the size of the openings 162 of the outlet structure 158. In an embodiment, the inlet and outlet structures 156, 158 can be formed from porous sintered metal.

The inlet structure 156 can be introduced into the passage 148 from the upstream end 150 of the housing 142 and disposed against the circumferential protrusion 154. A fastener 164 (e.g., a retainer ring) can be engaged with a radial groove 166 formed in the inner surface 144 of the housing 142 to lock the inlet structure 156 in the position abutting the upstream side of the protrusion 154. The outlet structure 158 can be introduced into the passage 148 from the downstream end 152 of the housing 142 and disposed against the downstream end of the circumferential protrusion 154. A fastener 168 (e.g., a retainer ring) can be engaged with a radial groove 170 formed in the inner surface 144 of the housing 142 to lock the outlet structure 158 in the position abutting the downstream side of the protrusion 154. In some embodiments, alternative structures can be used to maintain the position of the inlet structure 156 and/or the outlet structure 158, such as a snap ring, threads, threaded components, shrink fits, elastomeric elements, welding, or the like.

The T-shaped configuration of the protrusion 154 maintains a separation between the inlet and outlet structures 156, 158 to form a mixing chamber 172 therebetween. The diffuser assembly 126 includes a first static seal 171 (e.g., an O-ring) disposed between the inner surface 144, the protrusion 154 and the inlet structure 156. The diffuser assembly 126 also includes a second static seal 174 (e.g., an O-ring) disposed between the inner surface 144, the protrusion 154 and the outlet structure 158. The first and second static seals 171, 174 prevent the extracting solvent from flowing around the inlet and/or outlet structures 156, 158, and force the extracting solvent to pass through the openings 160, 162 of the inlet and outlet structures 156, 158.

Thus, as the extracting solvent flows along the extraction path, the extracting solvent passes first through the inlet structure 156, mixes within the mixing chamber 172, and passes through the outlet structure 158. Such passage of the extracting solvent redistributes flow of the extracting solvent along the extraction path to prevent or reduce channeling of the extracting solvent through the matrix 128a, 128b (e.g., creating a substantially more even flow distribution of the extracting solvent through the extraction vessel 100). Particularly, any channeling occurring in the extracting solvent upstream of the inlet structure 156 is reset or redistributed when the extracting solvent enters the mixing chamber 172. For example, due to resistance in flow from the outlet structure 158, swirling of the extracting solvent within the mixing chamber 172 redistributes the extracting solvent to exit through the outlet structure 158 in a substantially more even manner that minimizes formation of channels in the downstream flow. The redistributed extracting solvent exits the mixing chamber 172 through the outlet structure 158 in a non-channeling flow pattern. In some embodiments, multiple diffuser assemblies 126 can be distributed along the extraction path to redistribute the extracting solvent flow pattern through the matrix 128a, 128b.

In some embodiments, the housing 142 can include one or more circumferential grooves 176, 178 formed in the outer surface 146 each configured and dimensioned to receive a seal 180, 182 (e.g., a static seal, a dynamic seal, or the like). In an embodiment where the seals 180, 182 are static seals, the seals 180, 182 maintain the static position of the diffuser assembly 126 along the extraction path and do not allow the diffuser assembly 126 to slide under pressure from the extracting solvent. The static seals 180, 182 create a fluidic seal between the housing 142 and the passage 108 of the extraction vessel 100, thereby preventing the extracting solvent from flowing around the diffuser assembly 126 within the extraction vessel 100. The substantially more even flow distribution of the extracting solvent through the extraction vessel 100 due to the diffuser assembly 126 advantageously increases the extraction efficiency of the extraction vessel 100, providing for a higher yield of extract.

In an embodiment where the seals 180, 182 are dynamic seals, the seals 180, 182 create a fluidic seal between the housing 142 and the passage 108 of the extraction vessel 100, thereby preventing the extracting solvent from flowing around the diffuser assembly 126 within the extraction vessel 100. The dynamic seals 180, 182 allow the diffuser assembly 126 to slide along the extraction path within the extraction vessel 100 under pressure of the extracting solvent, thereby compressing the downstream matrix 128b. For example, if the diffuser assembly 126 is originally disposed at a substantially central location between the inlet and outlet ends 104, 106 of the extraction vessel 100, pressure of the extracting solvent passing along the extraction path can force the diffuser assembly 126 to slide in the direction of the outlet end 106 and against the matrix 128b.

In some embodiments, the housing 142 can include one or more handles 184, 186 rotatably secured to the housing 142 and configured to be positioned in an extended position or a stored position. For example, the housing 142 can include a handle 184 disposed at the upstream end 150 and/or a handle 186 disposed at the downstream end 152. FIG. 4 shows the handle 184 positioned in a stored position, and shows the handle 186 positioned in a partially extended position. An opening 188, 190 (e.g., an engagement mechanism to be used with a spring-loaded pin, set screw, or the like) can be located on the handle 184, 186 or the inner surface 144 for engagement with a corresponding groove or opening 191 such that the handle 184, 186 can be maintained in the stored position during use of the extraction vessel 100. For example, a set screw can be passed through the opening 190 and into the corresponding groove or opening 191 to secure the handle 186 in the stored position. In the extended position, the handle 184, 186 can be used to position the diffuser assembly 126 within the extraction vessel 100 or remove the diffuser assembly 126 from the extraction vessel 100.

Figure 5:
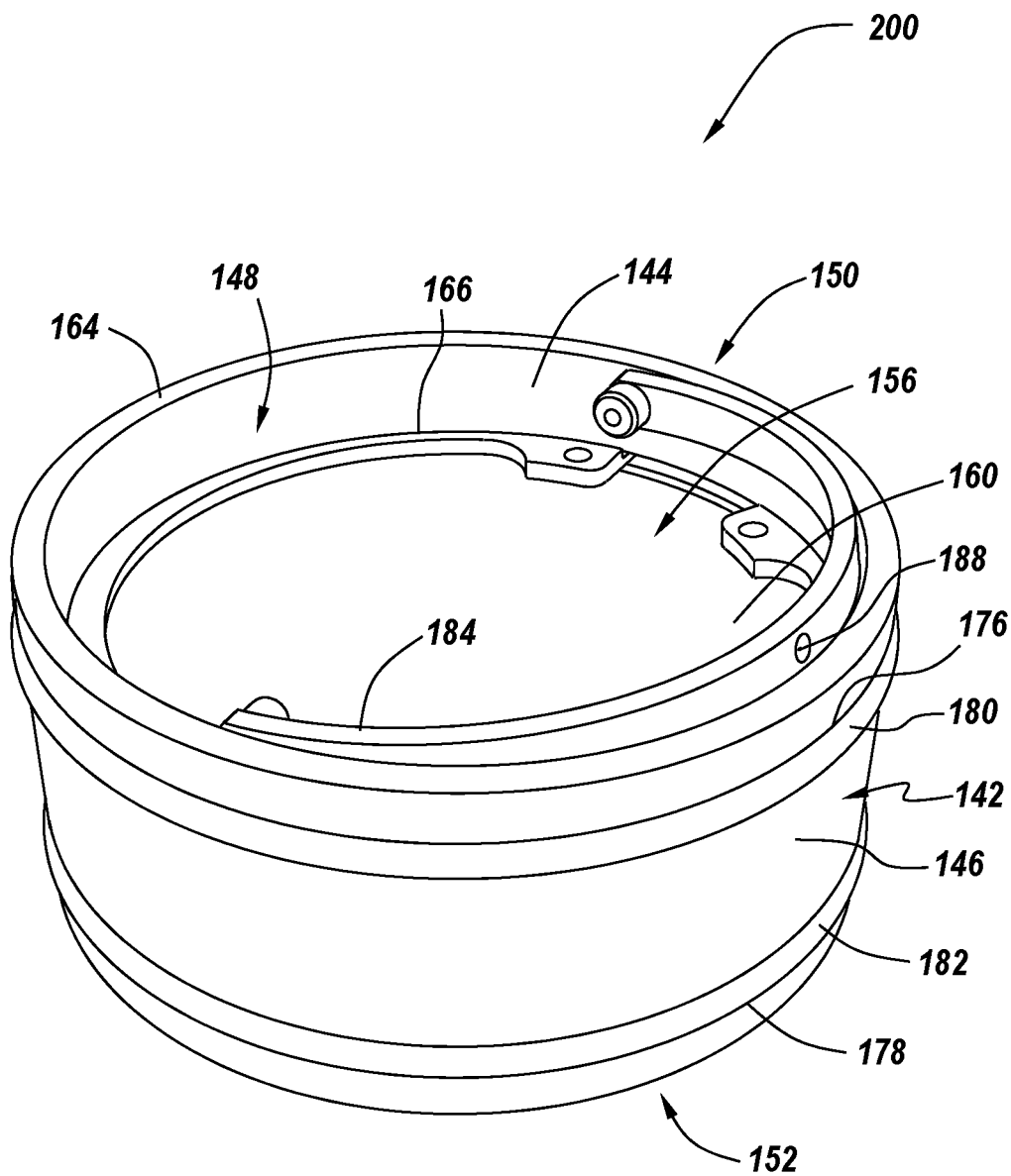
FIG. 5 is a perspective view of an exemplary diffuser assembly in accordance with embodiments of the present disclosure.
Figure 6:
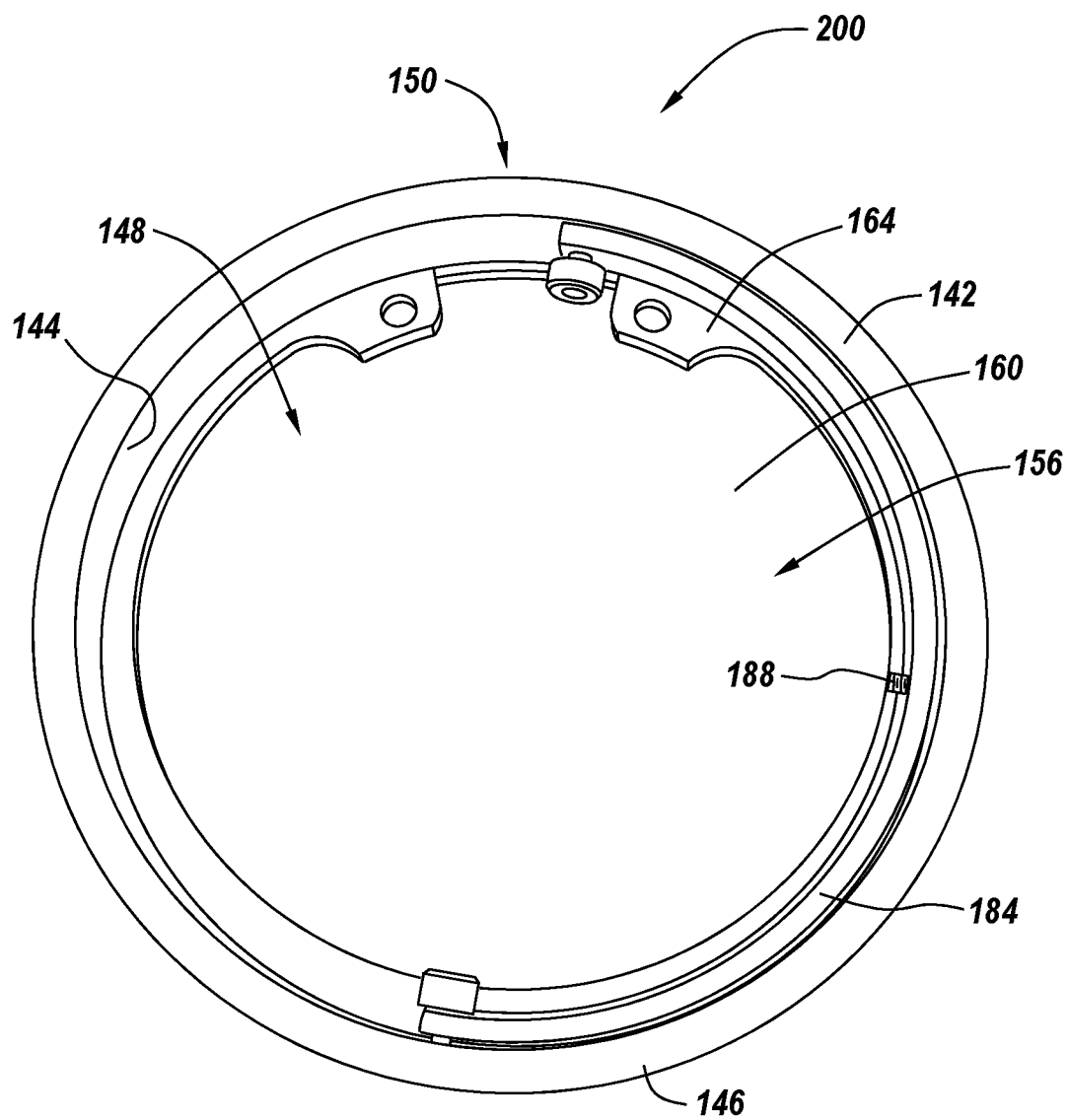
FIG. 6 is a top view of an exemplary diffuser assembly in accordance with embodiments of the present disclosure.

FIGS. 5 and 6 show perspective and top views of an exemplary diffuser assembly 200 in accordance with embodiments of the present disclosure. The diffuser assembly 200 can be substantially similar in structure and function to the diffuser assembly 126, and generally represents a prototype of the diffuser assembly 126. Therefore, diffuser assemblies 126 and 200 generally represent identical structures and the same reference numbers are used to represent such structures. Although not visible in FIGS. 5 and 6, it should be understood that the diffuser assembly 126 includes an outlet structure 158, the circumferential protrusion 154, the mixing chamber 172, and the seals 171, 174 disposed within the housing 142.

Figure 7:
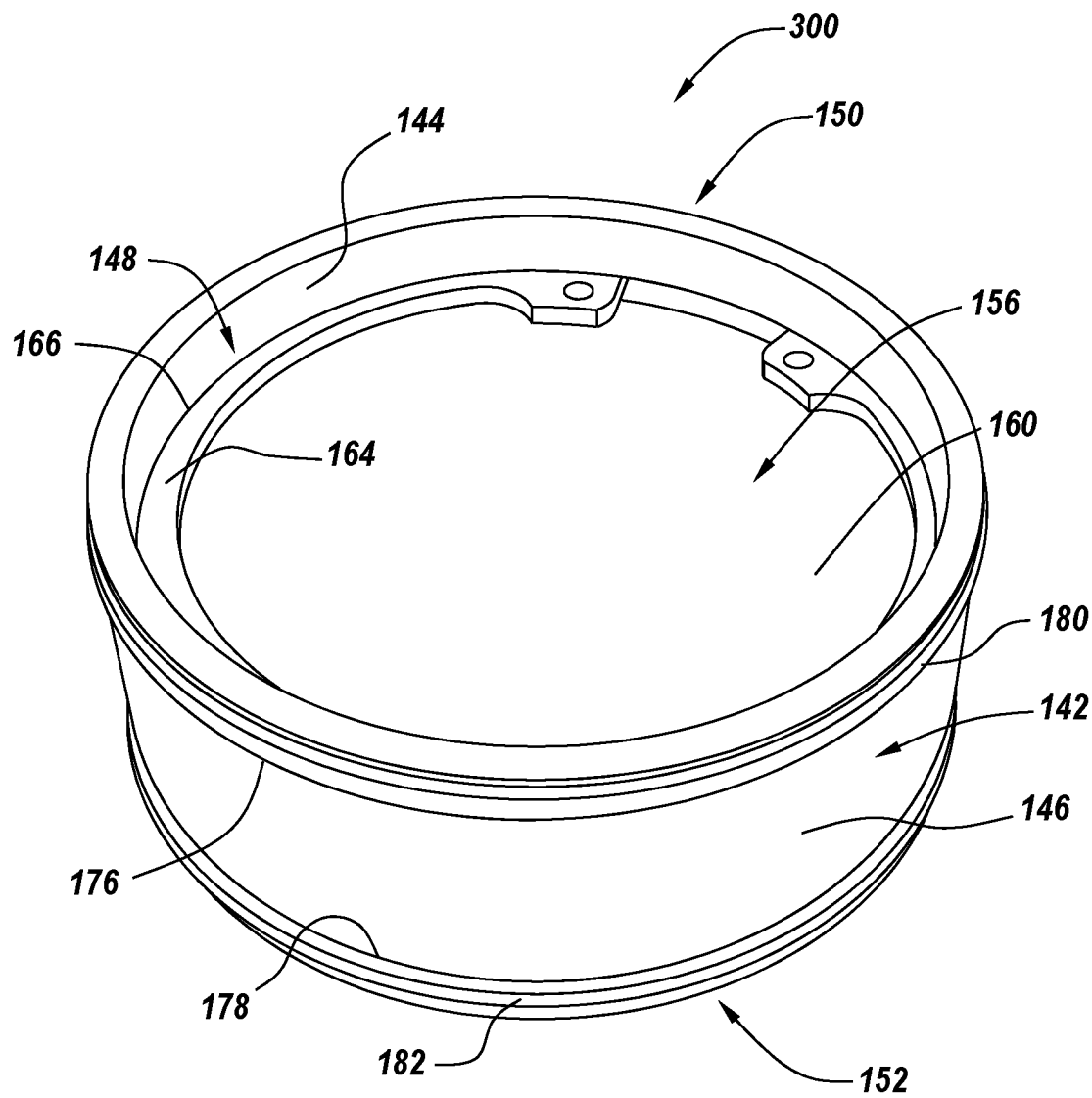
FIG. 7 is a perspective view of an exemplary diffuser assembly in accordance with embodiments of the present disclosure.

FIG. 7 shows a perspective view of an exemplary diffuser assembly 300 in accordance with embodiments of the present disclosure. The diffuser assembly 300 can be substantially similar in structure and function to the diffuser assembly 126, 200, except for the distinctions noted herein. Therefore, like reference numbers represent like structures. In particular, the diffuser assembly 300 may be without a handle 184 and can be removed from the passage 108 via suction through application of a vacuum. Although not visible in FIG. 7, it should be understood that the diffuser assembly 126 includes an outlet structure 158, the circumferential protrusion 154, the mixing chamber 172, and the seals 171, 174 disposed within the housing 142.

Figure 8:
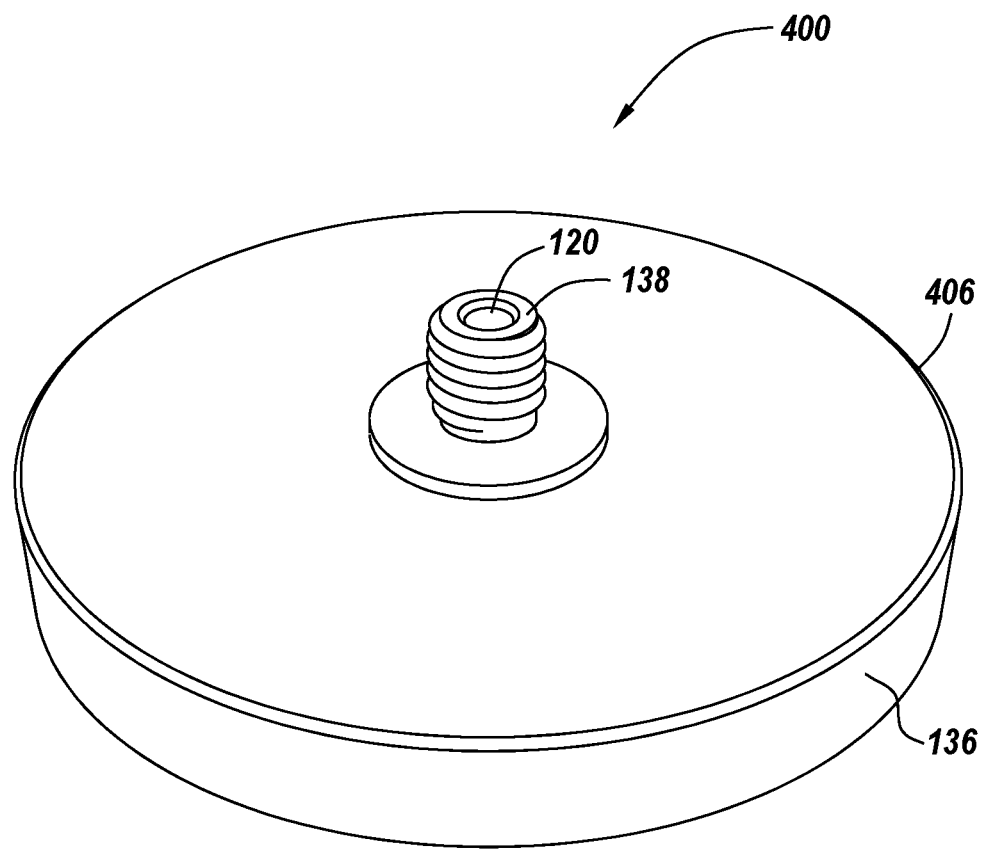
FIG. 8 is a top, perspective view of an exemplary frit holder assembly that screws into end caps located at inlet and outlet ends of an extraction vessel in accordance with embodiments of the present disclosure.
Figure 9:
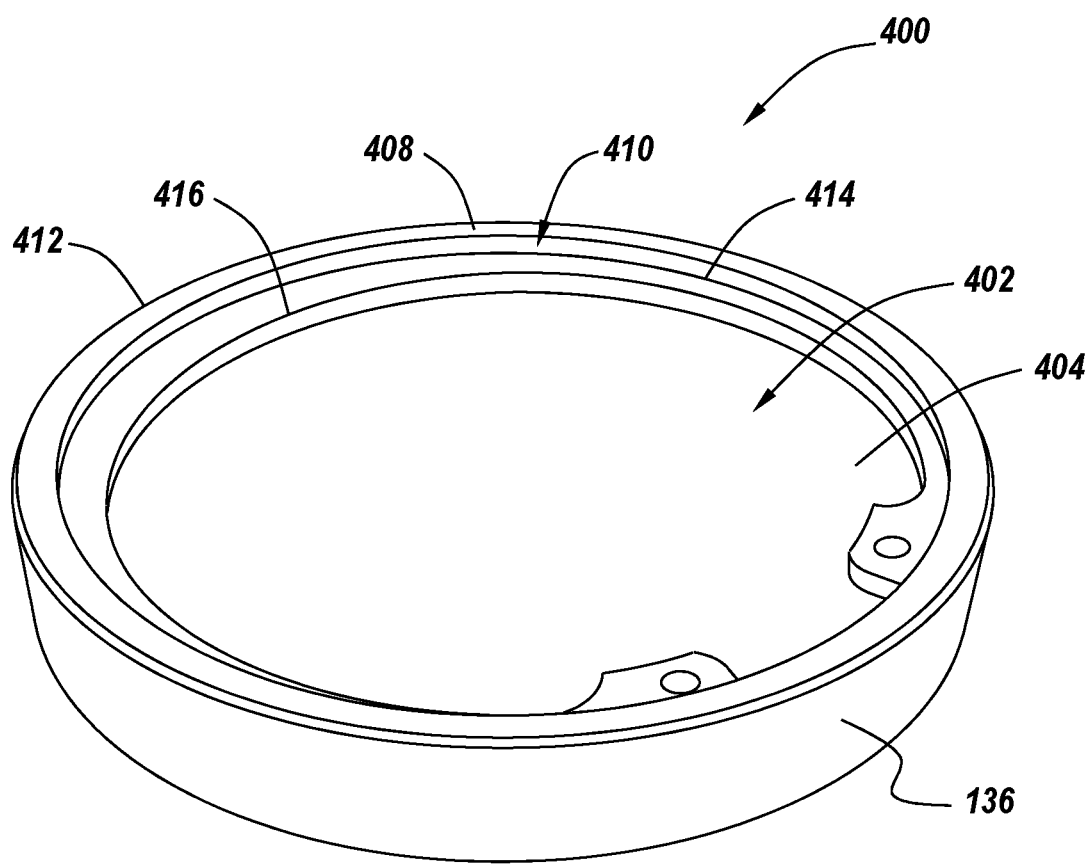
FIG. 9 is a bottom, perspective view of an exemplary frit holder assembly that screws into end caps located at inlet and outlet ends of an extraction vessel in accordance with embodiments of the present disclosure.

FIGS. 8 and 9 show top and bottom perspective views of an exemplary frit holder assembly 400 in accordance with embodiments of the present disclosure. The frit holder assembly 400 can be substantially similar in structure and function to the inlet and outlet frit holder assemblies 112, 116, except for the distinctions noted herein. Therefore, like reference numbers represent like structures. In particular, in some embodiments, the frit holder assembly 400 can be configured and dimensioned to retain a porous structure 402 (e.g., a frit with openings 404) for evenly distributing flow of the extracting solvent introduced into the passage 108 or exiting from the passage 108.

The body 136 can include a solid first surface 406 from which the protrusion 138 extends. The opposite second surface 408 includes a hollow interior 410 configured to receive the porous structure 402. An inner surface 412 of the hollow interior 410 includes a circumferential groove 414 configured to receive a fastener 416 (e.g., a retainer ring). The fastener 416 maintains the position of the porous structure 402 within the body 136, thereby ensuring that the extracting solvent flows through the openings 404. As discussed above, the protrusion 138 can be threaded into a complementary opening in the inlet or outlet cap 110, 114 prior to insertion of the inlet or outlet cap 110, 114 into the passage 108. The seal 140 around the inlet or outlet cap 110, 114 prevents the extracting solvent from flowing out of the passage 108 and/or around the porous structure 402. A substantially even flow distribution of the extracting solvent is therefore created at the outer extremities of the passage 108.

Figure 10:
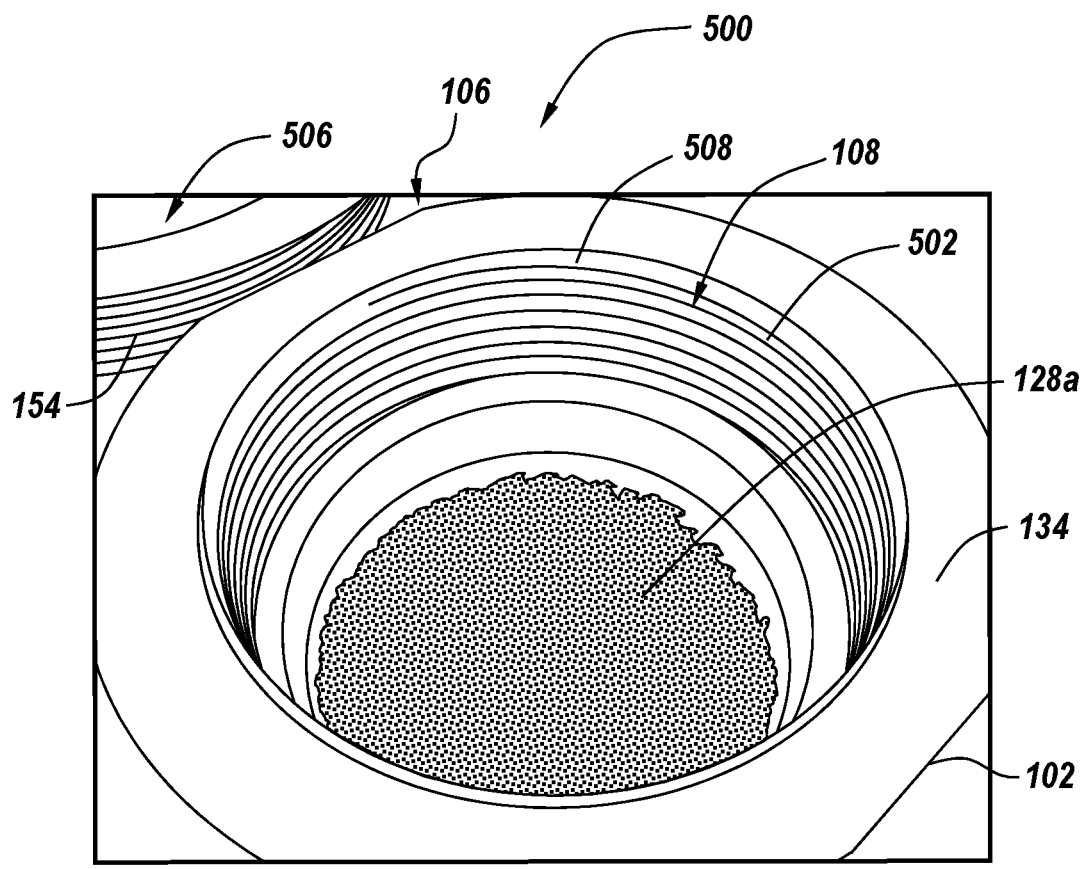
FIG. 10 is a perspective view of an outlet end of an extraction vessel filled with lavender buds in accordance with embodiments of the present disclosure.

FIG. 10 is a perspective view of an outlet end 106 of an extraction vessel 500 when flow is from the bottom to the top in accordance with embodiments of the present disclosure. The extraction vessel 500 can be substantially similar in structure and function to the extraction vessel 100. Therefore, like reference numbers represent like structures. In particular, the cross-section zone 508 (e.g., the inner section) of the extraction vessel 100 includes threads 502 complementary to outer threads 504 of an inlet cap 506. The inlet cap 506 can therefore be threaded into the passage 108 to maintain the packed matrix 128a within the passage 108.

Experimentation was performed in two laboratories in different states (Delaware and Pennsylvania) and by different laboratory personnel to determine whether incorporation of the diffuser assembly into an extraction vessel increases the extraction yield as compared to the extraction yield obtained when no diffuser assembly was used. The conditions in both labs were similar, but not identical. Nevertheless, the results from both labs clearly show that including the diffuser assembly in the extraction vessel (e.g., the middle of the extraction vessel) increases extraction yield.

Figure 11:
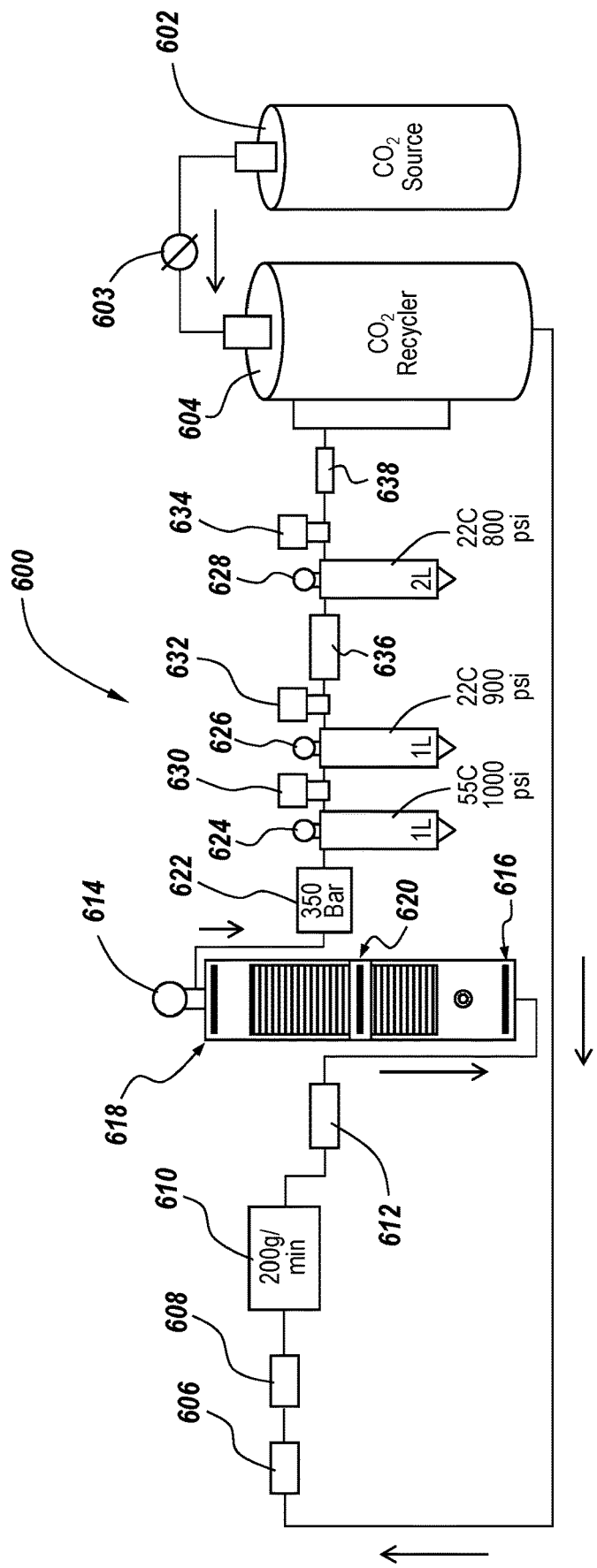
FIG. 11 is a diagrammatic representation of an experimentation system used for testing an exemplary diffuser assembly.

FIG. 11 is a diagrammatic representation of the experimentation system 600 used in performing the noted experiments. The system 600 includes a $CO_2$ source 602 from which $CO_2$ flows into a $CO_2$ recycler 604. The system 600 can have an on/off valve 603 between the source 602 and recycler 604. From the recycler 604, the extraction solvent flows into an inlet filter 606 and further into a cooling heat exchanger (HE) 608. The system 600 includes a $CO_2$ pump 610 (e.g., a 200 g/min pump). The system 600 includes a pre-heater 612 (e.g., a 65° C. pre-heater) downstream of the pump 610, and an extraction vessel 614 downstream of the pre-heater 612. The extraction vessel 614 includes an inlet frit 616, an outlet frit 618, and a diffuser assembly 620 between the inlet and outlet frits 616, 618.

The system 600 includes an automatic back pressure regulator 622 (e.g., a 350 bar back pressure regulator) downstream of the extraction vessel 614, and a first cyclone separator (CS1) 624 (e.g., a 55° C., 1,000 psi, 1 L cyclone separator), a second cyclone separator (CS2) 626 (e.g., a 22° C., 900 psi, 1 L cyclone separator), and a third cyclone separator (CS3) 628 (e.g., a 22° C., 800 psi, 2 L cyclone separator) having a respective manual back pressure regulator 630, 632, 634 immediately downstream of each cyclone separator 624, 626, 628. The system 600 includes a heater 636 (e.g., a 30° C. heater) between the manual back pressure regulator 632 and the third cyclone separator 628, and further includes a headline filter 638 (e.g., a 5 µm headline filter) disposed between the manual back pressure regulator 634 and the return line of the recycler 638.

The Pennsylvania laboratory results were obtained using the following conditions: (1) a 5 L extraction vessel including lavender buds as the packed matrix, (2) a recycle system operated under standard conditions 800 psi incoming $CO_2$, (3) 200 g/m $CO_2$ flow, (4) 55° C. extraction vessel (set point was 55° C. and actual temperature did not rise above 53° C. and was usually no higher than 45° C.), (5) the heat exchanger (e.g., pre-heater) was set to 65° C., (6) 350 bar extraction pressure, (7) cyclone separator CS 1 1 L 55° C. and 1000 psi, (8) CS 2 1 L 22° C. and 900 psi, (9) CS 3 2 L 22° C. and 800 psi outgoing $CO_2$, (10) no basket was used in the 5 L vessel, (11) amount of lavender was the same in all experiments at 629 g (except one at 649 g), (12) heat exchanger plumbed between CS 2, turned on and set to 30° C., (13) 5 µm headline particulate filter plumbed in post CS 3, (14) 30 minute extraction time after set points reached (except for the temperature of the 5 L vessel), (15) diffuser was used in the middle of the 5 L extraction vessel, and (16) recycle tank drained and weighed the collected material (the amount of carryover).

Extract was collected in various places throughout the extraction system, including cyclone separators 1, 2 and 3, the recycle tank, the 5 µm headline filter plumbed after cyclone separator 3, and a 5 µm filter plumbed after the recycle tank. The amount of material collected at each point was weighed using an analytical balance. The values shown in Table 1 (below) represent the total amount of extract collected at the various collection points. In three experiments no diffuser assembly was used and in another two experiments the diffuser assembly was used. The only difference between the two sets of experiments done in the Pennsylvania laboratory is that in one set, no diffuser assembly was used and in the second set of experiments, a diffuser assembly was used.

The three experiments performed without the diffuser assembly shown in Table 1 all used approximately 629 g of lavender in the 5 L extraction vessel. The two experiments performed with the diffuser assembly used 645 g and 629 g of lavender, respectively. Even though slightly more lavender was used in one of the experiments performed with the diffuser assembly, the results clearly indicate that the diffuser assembly increases the extraction yield. Based on these observations, the diffuser assembly increased lavender extraction yield by 4.7 g, or about 10.5%.

It should be noted that both results obtained with the diffuser assembly are greater than any of the three results without a diffuser assembly, and both of the results obtained with the diffuser assembly fall outside the +/− of the average value's standard deviation. This further emphasizes that using the diffuser assembly results in greater yield of lavender extract when evaluated by measuring the amount of extract collected.

TABLE 1

Total Amount of Lavender Extract Collected At All Collection Points

| Experiment Number | Without Diffuser Assembly | With Diffuser Assembly |
|---|---|---|
| 1 | 44.32 g | 47.66 g |
| 2 | 43.93 g | 51.30 g |
| 3 | 44.07 g | N/A |
| Avg. | 44.78 g | 49.48 g |
| Std. dev. | 1.14 g | |

Another way to determine the amount extracted from the lavender buds is to weigh the amount of lavender buds added to the 5 L extraction vessel before and after extraction. The amount of lavender missing from the extraction vessel after extraction is shown in Table 2 (below) with and without a diffuser assembly.

TABLE 2

Amount of Lavender Missing From 5 L Extraction Vessel After Extraction

| Experiment Number | Without Diffuser Assembly | With Diffuser Assembly |
|---|---|---|
| 1 | 47.84 g | 55.68 g |
| 2 | 49.42 g | 58.12 g |
| 3 | 58.61 g | N/A |
| Avg. | 51.96 g | 56.90 g |
| Std. dev. | 5.82 g | |

The three experiments in Table 2 were performed without the diffuser assembly and each experiment used approximately 629 g of lavender in the 5 L extraction vessel. The two experiments performed with the diffuser assembly used 645 g and 629 g of lavender, respectively. Even though slightly more lavender was used in one of the experiments performed with the diffuser assembly, the results are comparable. The results indicate that the diffuser assembly increases the amount of lavender removed from the 5 L extraction vessel. Based on these observations, the diffuser increases the average amount of lavender removed from the extraction vessel from 51.96 g to 56.9 g. Thus, about 9.5% more lavender is removed from the vessel when the diffuser assembly is used.

Both sets of results from the Pennsylvania lab show that including the diffuser assembly into the middle of the extraction vessel increases extraction yield. The Pennsylvania lab results were further confirmed in lab results from Delaware. Although some of the experimental conditions used in the Delaware lab were different from those used in the Pennsylvania lab, the important parameters were similar. In particular, the temperatures, pressures, flow rate and substrate were the same in both labs. The amount of lavender used in the Delaware lab was 580 g, while in Pennsylvania lab it was usually about 629 g. The Delaware lab extraction lasted 120 min, while the Pennsylvania lab extraction lasted 30 min. The results from the Delaware lab indicated that yield of lavender extract increased from 58.9 g and 55.8 g (an average of 57.4 g) without the diffuser assembly to 66.9 g, 69.5 g and 71.9 g (an average of 69.4 g) with the diffuser assembly, an increase of 12.0 g or 21 wt %. Thus, the Delaware lab results also confirmed that inclusion of the diffuser assembly in the extraction vessel increased the extraction yield.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A diffuser assembly configured to be disposed in an extraction path of an extracting solvent in an extraction vessel, the diffuser assembly comprising:
   a housing configured to be disposed within the extraction vessel, the housing including an inner surface and an outer surface;
   an inlet structure fastened to the housing;
   an outlet structure fastened to the housing and spaced from the inlet structure to form a mixing chamber between the inlet structure and the outlet structure; and
   one or more dynamic seals disposed on the outer surface of the housing, the one or more dynamic seals preventing the extracting solvent from flowing around the diffuser assembly within the extraction vessel while allowing the diffuser assembly to slide along the extraction path within the extraction vessel under pressure of the extracting solvent;
   wherein the inlet structure and the outlet structure each have a porosity configured for passage of the extracting solvent therethrough; and
   wherein passage of the extracting solvent through the inlet structure, the mixing chamber, and the outlet structure redistributes flow of the extracting solvent along the extraction path more equally than without the mixing chamber.

2. The diffuser assembly of claim 1, comprising a first static seal disposed between the inner surface of the housing and the inlet structure, and a second static seal disposed between the inner surface of the housing and the outlet structure.

3. The diffuser assembly of claim 1, wherein the extracting solvent is compressed $CO_2$, or compressed $CO_2$ and a co-solvent.

4. The diffuser assembly of claim 1, wherein redistribution of flow of the extracting solvent along the extraction path results in a substantially more even flow distribution of the extracting solvent through the extraction vessel.

5. The diffuser assembly of claim 1, wherein each of the inlet structure and the outlet structure is a frit including a plurality of openings, each of the plurality of openings being dimensioned between 0.5 µm and 25 µm.

6. The diffuser assembly of claim 5, wherein each of the plurality of openings is 5 µm.

7. The diffuser assembly of claim 5, wherein the frit includes porous sintered metal.

8. The diffuser assembly of claim 5, wherein each frit defines a disk configuration.

9. The diffuser assembly of claim 5, wherein a size of the plurality of openings of the inlet structure is dimensioned equal to a size of the plurality of openings of the outlet structure.

10. The diffuser assembly of claim 5, wherein a size of the plurality of openings of the inlet structure is dimensioned different from a size of the plurality of openings of the outlet structure.

11. The diffuser assembly of claim 1, wherein redistribution of flow of the extracting solvent reduces effects of flow channels entering the diffuser assembly, and reduces or prevents downstream channeling of the extracting solvent through a matrix packing within the extraction path of the extraction vessel.

12. A diffuser assembly configured to be disposed in an extraction path of an extracting solvent in an extraction vessel, the diffuser assembly comprising:
    a housing configured to be disposed within the extraction vessel, the housing including an inner surface and an outer surface;
    an inlet structure fastened to the housing;
    an outlet structure fastened to the housing and spaced from the inlet structure to form a mixing chamber between the inlet structure and the outlet structure; and
    one or more static seals disposed on the outer surface of the housing, the one or more static seals preventing the extracting solvent from flowing around the diffuser assembly within the extraction vessel and maintaining a static position of the diffuser assembly along the extraction path within the extraction vessel;
    wherein the inlet structure and the outlet structure each have a porosity configured for passage of the extracting solvent therethrough; and
    wherein passage of the extracting solvent through the inlet structure, the mixing chamber, and the outlet structure redistributes flow of the extracting solvent along the extraction path more equally than without the mixing chamber.

13. A diffuser assembly configured to be disposed in an extraction path of an extracting solvent in an extraction vessel, the diffuser assembly comprising:
    a housing configured to be disposed within the extraction vessel, the housing including an inner surface and an outer surface;
    an inlet structure fastened to the housing;
    an outlet structure fastened to the housing and spaced from the inlet structure to form a mixing chamber between the inlet structure and the outlet structure; and
    one or more handles rotatably secured to the housing and configured to be positioned in an extended position or a stored position;
    wherein the inlet structure and the outlet structure each have a porosity configured for passage of the extracting solvent therethrough; and
    wherein passage of the extracting solvent through the inlet structure, the mixing chamber, and the outlet structure redistributes flow of the extracting solvent along the extraction path more equally than without the mixing chamber.

* * * * *